(12) United States Patent
Wang et al.

(10) Patent No.: US 12,505,301 B2
(45) Date of Patent: Dec. 23, 2025

(54) AUTOMATED GENERATION OF DIALOGUE FLOW FROM DOCUMENTS

(71) Applicant: INTERNATIONAL BUSINESS MACHINES CORPORATION, Armonk, NY (US)

(72) Inventors: Dakuo Wang, Cambridge, MA (US); Anbang Xu, San Jose, CA (US); Mo Yu, White Plains, NY (US); Chuang Gan, Cambridge, MA (US); Xiaotong Liu, San Jose, CA (US); Haibin Liu, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 855 days.

(21) Appl. No.: 17/452,624

(22) Filed: Oct. 28, 2021

(65) Prior Publication Data
US 2023/0135625 A1    May 4, 2023

(51) Int. Cl.
*G06F 40/35*    (2020.01)
*G06F 18/21*    (2023.01)
(Continued)

(52) U.S. Cl.
CPC ............ *G06F 40/35* (2020.01); *G06F 18/214* (2023.01); *G06F 18/2178* (2023.01); *G06F 40/295* (2020.01); *G06N 5/04* (2013.01)

(58) Field of Classification Search
CPC ............. G06N 5/04; G06N 3/006; G06N 3/08
See application file for complete search history.

(56) References Cited

U.S. PATENT DOCUMENTS 9,330,084 B1    5/2016  Kadambi et al.
9,348,817 B2    5/2016  Bohra
(Continued)

FOREIGN PATENT DOCUMENTS

CN    101710343 A    5/2010
CN    108446321 A    8/2018
(Continued)

OTHER PUBLICATIONS

Uva et al. "Dialog-based Help Desk through Automated Question Answering and Intent Detection". Computational Linguistics CLIC-it 2020 (Year: 2020).*
(Continued)

*Primary Examiner* — Jesse S Pullias
(74) *Attorney, Agent, or Firm* — Garg Law Firm, PLLC; Rakesh Garg; Michael O'Keefe

(57) ABSTRACT

A computerized method, system and computer program product for building a dialogue flow. One embodiment of the method may comprise receiving an input document, the input document comprising content, and generating, by a question-answer pipeline, a plurality of question-answer pairs from the content of the input document. For each question-answer pair, the method may further comprise feeding the question of the question-answer pair into an intent of a dialogue flow structure, and feeding the answer of the question-answer pair as one response of the intent. The method may further comprise tagging each of the plurality of question-answer pairs with a corresponding document section index, reading, by a conversational agent, the input document to a user, pausing the reading when the conversational agent reaches one of the document section indices in the input document, and in response, reading the question corresponding to the document section indicia to the user.

17 Claims, 10 Drawing Sheets

(51) Int. Cl.
  *G06F 18/214* (2023.01)
  *G06F 40/295* (2020.01)
  *G06N 5/04* (2023.01)

(56) References Cited

U.S. PATENT DOCUMENTS

| | | | |
|---|---|---|---|
| 9,621,601 | B2 | 4/2017 | Johnson, Jr. |
| 10,083,213 | B1 | 9/2018 | Podgorny et al. |
| 10,275,448 | B2 | 4/2019 | Isensee |
| 10,700,919 | B2 | 6/2020 | Tee |
| 10,796,093 | B2 | 10/2020 | Avedissian |
| 10,929,392 | B1 | 2/2021 | Cheng |
| 10,931,739 | B2 | 2/2021 | Camargo |
| 2010/0076998 | A1 | 3/2010 | Podgorny et al. |
| 2011/0125734 | A1 | 5/2011 | Duboue |
| 2012/0173464 | A1 | 7/2012 | Tur |
| 2014/0046947 | A1 | 2/2014 | Jenkins et al. |
| 2014/0072947 | A1 | 3/2014 | Boguraev |
| 2014/0358922 | A1* | 12/2014 | Alkov ............... G06F 16/3329 707/737 |
| 2015/0006143 | A1 | 1/2015 | Skiba |
| 2015/0178623 | A1 | 6/2015 | Balani et al. |
| 2016/0247068 | A1* | 8/2016 | Lin .................... G06F 40/40 |
| 2017/0032689 | A1 | 2/2017 | Beason et al. |
| 2018/0114108 | A1 | 4/2018 | Lao |
| 2018/0365228 | A1* | 12/2018 | Galitsky ............. G06F 40/35 |
| 2019/0147044 | A1 | 5/2019 | Bangalore |
| 2019/0317994 | A1 | 10/2019 | Singh |
| 2019/0340172 | A1* | 11/2019 | McElvain ........... G06F 16/248 |
| 2020/0042597 | A1 | 2/2020 | Wu |
| 2021/0134173 | A1* | 5/2021 | Yuan .................. G06N 3/045 |
| 2021/0157857 | A1 | 5/2021 | Nogueira et al. |
| 2021/0390418 | A1* | 12/2021 | Mass .................. G06N 3/08 |
| 2021/0406735 | A1* | 12/2021 | Nahamoo ........... G06F 16/24522 |

FOREIGN PATENT DOCUMENTS

| | | |
|---|---|---|
| CN | 112231537 A | 1/2021 |
| CN | 112949758 A | 6/2021 |
| TW | 201832104 A | 9/2018 |
| TW | 202034207 A | 9/2020 |
| TW | I815605 B | 5/2023 |

OTHER PUBLICATIONS

A Method and System for Ensemble Decision Making for a Goal-Driven Dialog Assistant, ip.com, IPCOM000264768D, Published Jan. 25, 2021.

A. Mondal, M. Dey, D. Das, S. Nagpal and K. Garda, "Chatbot: An automated conversation system for the educational domain," 2018 International Joint Symposium on Artificial Intelligence and Natural Language Processing (iSAI-NLP), 2018, pp. 1-5, doi: 10.1109/iSAI-NLP.2018.8692927.

AIOps, IBM Cloud Education, Apr. 15, 2020, https://www.ibm.com/cloud/learn/aiops. Retrieved from internet on Oct. 26, 2021.

Anthony Fader, Open Question Answering, Dissertation (2014) University of Washington, https://digital.lib.washington.edu/researchworks/handle/1773/26336.

B. Xu, Z. Xing, X. Xia and D. Lo, "AnswerBot: Automated generation of answer summary to developers' technical questions," 2017 32nd IEEE/ACM International Conference on Automated Software Engineering (ASE), 2017, pp. 706-716, doi: 10.1109/ASE.2017.8115681.

Chin-Yew Lin, ROUGE: a Package for Automatic Evaluation of Summaries, Jul. 2004, Workshop on Text Summarization Branches Out, Post-Conference Workshop of ACL 2004, Barcelona, Spain, Microsoft, https://www.microsoft.com/en-us/research/publication/rouge-a-package-for-automatic-evaluation-of-summaries/.

Deploying and Administering Avaya Equinox® Attendant, AVAYA, Release 5.0, Issue 3, Sep. 2018, https://downloads.avaya.com/css/P8/documents/101044486. Retrieved from internet on Oct. 26, 2021.

Format guidelines for imported documents and URLs, Microsoft, Jun. 1, 2021, https://docs.microsoft.com/en-us/azure/cognitive-services/qnamaker/reference-document-format-guidelines. Retrieved from internet on Oct. 26, 2021.

Grace Period Disclosure—Yao, Bingsheng and Wang, Dakuo and Wu, Tongshuang and Hoang, Tran and Sun, Branda and Li, Toby Jia-Jun and Yu, Mo and Xu, Ying, "It is AI's Turn to Ask Human a Question: Question and Answer Pair Generation for Children Storybooks in FairytaleQA Dataset," arXiv preprint arXiv:2109.03423 (2021).

Grace Period Disclosure—Zhang, Zheng and Xu, Ying and Wang, Yanhao and Yao, Bingsheng and Ritchie, Daniel and Wu, Tongshuang and Yu, Mo and Wang, Dakuo, "StoryBuddy: A Human-AI Collaborative Agent for Parent-Child Interactive Storytelling with Flexible Parent Involvement," arXiv preprint arXiv:2109.03423 (2021).

Identifying and Determining Trustworthiness of a Machine-Learned Model, IP.com, IPCOM000252359D, Published Jan. 5, 2018.

Kunichika, Hidenobu, Tomoki Katayama, Tsukasa Hirashima and Akira Takeuchi. "Automated Question Generation Methods for Intelligent English Learning Systems and its Evaluation." (2001). https://www.researchgate.net/publication/228948179_Automated_question_generation_methods_for_intelligent_English_learning_systems_and_its_evaluation.

Kuyten, Pascal, Timothy W. Bickmore, Svetlana Stoyanchev, Paul Piwek, Helmut Prendinger and Mitsuru Ishizuka. "Fully Automated Generation of Question-Answer Pairs for Scripted Virtual Instruction." IVA (2012). https://api.semanticscholar.org/CorpusID:14660185.

Kybartas B., Bidarra R. (2015) A Semantic Foundation for Mixed-Initiative Computational Storytelling. In: Schoenau-Fog H., Bruni L., Louchart S., Baceviciute S. (eds) Interactive Storytelling. ICIDS 2015. Lecture Notes in Computer Science, vol. 9445. Springer, Cham. https://doi.org/10.1007/978-3-319-27036-4_15.

List of IBM Patents or Patent Applications Treated as Related.

Mike Lewis, Yinhan Liu, Naman Goyal, Marjan Ghazvininejad, Abdelrahman Mohamed, Omer Levy, Veselin Stoyanov, Luke Zettlemoyer: BART: Denoising Sequence-to-Sequence Pre-training for Natural Language Generation, Translation, and Comprehension. https://arxiv.org/abs/1910.13461.

Mou, Xiangyang, Mo Yu, Bingsheng Yao, Chenghao Yang, Xiaoxiao Guo, Saloni Potdar and Hui Su. "Frustratingly Hard Evidence Retrieval for QA Over Books." NUSE (2020). https://arxiv.org/abs/2007.09878.

Paris, Alison H. and Scott George Paris. "Assessing narrative comprehension in young children." Reading Research Quarterly 38 (2003): 36-76. https://api.semanticscholar.org/CorpusID:146291044.

System and Method for Conformance Checking of Conversational Process Instance Against a Conversational Process Model, IP.com, IPCOM000262185D, Published May 11, 2020.

The Kore.AI Purpose—Automate conversational interactions, https://kore.ai/. Retrieved from internet on Oct. 26, 2021.

Wu, CH., Liu, CH. & Su, PH. Sentence extraction with topic modeling for question-answer pair generation. Soft Comput 19, 39-46 (2015). https://doi.org/10.1007/s00500-014-1386-6.

Ying Xu and Mark Warschauer. 2020. Exploring young children's engagement in joint reading with a conversational agent. In <i>Proceedings of the Interaction Design and Children Conference</i> (<i>IDC '20</i>). Association for Computing Machinery, New York, NY, USA, 216-228. DOI:https://doi.org/10.1145/3392063.3394417.

Ying Xu, Dakuo Wang, Penelope Collins, Hyelim Lee, Mark Warschauer, Same benefits, different communication patterns: Comparing Children's reading with a conversational agent vs. a human partner, Computers & Education, vol. 161, 2021, 104059, ISSN 0360-1315, https://doi.org/10.1016/j.compedu.2020.104059.

Yubao, H.; AIOPS Practice in Network Operations and Maintenance, https://site.ieee.org/comsoc-cqr/files/2019/09/12-Yubao_He_ETR2019_Final.pdf.

Kumar et al., "Automatic question-answer pair generation using deep learning." 2021 Third International Conference on Inventive Research in Computing Applications (ICIRCA). IEEE, Oct. 2021, 6 pages.

(56) References Cited

OTHER PUBLICATIONS

Liu et al., "Asking questions the human way: Scalable question-answer generation from text corpus." Proceedings of The Web Conference, Apr. 2020, 12 pages.
Lovenia et al., "Automatic question-answer pairs generation from text." Proceedings of AI, Nov. 2018, 7 pages.
Qu et al., "Asking questions like educational experts: Automatically generating question-answer pairs on real-world examination data." arXiv preprint arXiv:2109.05179, Sep. 2021, 11 pages.
Shakeri et al., "End-to-end synthetic data generation for domain adaptation of question answering systems." arXiv preprint arXiv:2010.06028, Oct. 2020, 16 pages.
Taiwan Patent Office, "Office Action," May 9, 2023, 22 Pages, TW Application No. 111130335.
Willis et al., "Key phrase extraction for generating educational question-answer pairs." Proceedings of the sixth, ACM conference on learning @scale, Jun. 2019, 10 pages.
Rubin Gabriel T. "Trump Senate Impeachment Trial: How It Works and What You Need to Know", The Wall Street Journal, Feb. 9, 2021, 3 pages.

\* cited by examiner

```
                  ┌──────────┐
                  │   600    │
                  └──────────┘
                        │
                        ▼
┌─────────────────────────────────────────────────────────────────┐
│  COLLECT A PLURALITY OF QUESTIONS FROM CUSTOMERS, TOGETHER WITH │
│            THE ASSOCIATED PRODUCT DOCUMENTATION                 │
│                              605                                │
└─────────────────────────────────────────────────────────────────┘
                                │
                                ▼
┌─────────────────────────────────────────────────────────────────┐
│                  TRAIN MACHINE LEARNING MODELS                  │
│                              610                                │
└─────────────────────────────────────────────────────────────────┘
                                │
                                ▼
┌─────────────────────────────────────────────────────────────────┐
│               RECEIVE A NEW SET OF PRODUCT DOCUMENTATION        │
│                              615                                │
└─────────────────────────────────────────────────────────────────┘
                                │
                                ▼
┌─────────────────────────────────────────────────────────────────┐
│   GENERATE A PLURALITY OF ANSWERS BASED ON THE CONTENT OF THE   │
│                         INPUT DOCUMENT                          │
│                              620                                │
└─────────────────────────────────────────────────────────────────┘
                                │
                                ▼
┌─────────────────────────────────────────────────────────────────┐
│  GENERATE A QUESTION FOR EACH OF THE PLURALITY OF ANSWERS,      │
│             FORMING A PLURALITY OF QA PAIRS                     │
│                              625                                │
└─────────────────────────────────────────────────────────────────┘
                                │
                                ▼
┌─────────────────────────────────────────────────────────────────┐
│        RANK THE PLURALITY OF QA PAIRS BASED ON ONE OR MORE      │
│                             CRITERIA                            │
│                              630                                │
└─────────────────────────────────────────────────────────────────┘
                                │
                                ▼
┌─────────────────────────────────────────────────────────────────┐
│     SELECT AND RETURN PREDETERMINED NUMBER OF THE HIGHEST       │
│                         RANKED QA PAIRS                         │
│                              635                                │
└─────────────────────────────────────────────────────────────────┘
```

FIG. 6

AUTOMATED GENERATION OF DIALOGUE FLOW FROM DOCUMENTS

STATEMENT REGARDING PRIOR DISCLOSURES BY THE INVENTOR OR A JOINT INVENTOR

The following disclosure(s) are submitted under 35 U.S.C. 102(b)(1)(A), and are attached hereto as Appendix A and Appendix B:
 [1] Yao, Bingsheng and Wang, Dakuo and Wu, Tongshuang and Hoang, Tran and Sun, Branda and Li, Toby Jia-Jun and Yu, Mo and Xu, Ying, "It is AI's Turn to Ask Human a Question: Question and Answer Pair Generation for Children Storybooks in FairytaleQA Dataset," arXiv preprint arXiv:2109.03423 (2021); and
 [2] Zhang, Zheng and Xu, Ying and Wang, Yanhao and Yao, Bingsheng and Ritchie, Daniel and Wu, Tongshuang and Yu, Mo and Wang, Dakuo, "StoryBuddy: A Human-AI Collaborative Agent for Parent-Child Interactive Storytelling with Flexible Parent Involvement," arXiv preprint arXiv:2109.03423 (2021).

BACKGROUND

The present disclosure relates to artificial intelligence (AI), and more specifically, to the use of AI for human computer interaction (HCI).

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the relatively higher performance of those capabilities, resulting in computer systems today that are more powerful than just a few years ago.

Today, information technology (IT) departments are transitioning from a traditional infrastructure of separate, static, physical data processing systems (DPS) to a dynamic mix of on-premises, managed cloud, private cloud, and public cloud environments, running on virtualized or software-defined resources that scale and reconfigure constantly. Applications and systems across these environments, however, generate large volumes of data.

Traditional, domain-based IT management solutions can only provide limited help. For example, traditional solutions cannot intelligently sort the significant events out of the surrounding data. Further, these traditional solutions cannot correlate data across different (but interdependent) environments. Additionally, such traditional solutions cannot provide the real-time insight and predictive analysis that IT operations teams desire. Also, these traditional solutions cannot provide real-time insight and predictive analysis fast enough to meet user and customer service level expectations.

Artificial intelligence for IT Operations (AIOps) generally refers to a collection of solutions that provide visibility into performance data and dependencies across all environments; analyze the data to extract significant events related to slow-downs or outages; and automatically alert IT staff to problems, their root causes, and recommended solutions.

SUMMARY

According to embodiments of the present disclosure, a computerized method for automatically generating question and answer pairs comprising receiving an input document, the input document comprising content. The method may further comprise generating, by a first machine learning model from the input document, a plurality of answers based on the content of the input document, and generating, by a second machine learning model from the input document, a question for each of the plurality of answers to form a plurality of question-answer pairs. The method may further comprise ranking, by a third machine learning model, the plurality of question-answer pairs, selecting a predetermined number of highest ranked question-answer pairs, and returning the predetermined number of highest ranked question-answer pairs to a user.

According to embodiments of the present disclosure, a system for automatically generating question and answer pairs, comprising a processing unit and a memory coupled to the processing unit. The memory may contain program instructions executable by the processing unit to cause the processing unit to receive an input document, the input document comprising content. The memory may further contain program instructions to generate, by a first machine learning model from the input document, a plurality of answers based on the content of the input document, and generate, by a second machine learning model from the input document, a question for each of the plurality of answers to form a plurality of question-answer pairs. The memory may further contain program instructions to rank, by a third machine learning model, the plurality of question-answer pairs, select a predetermined number of highest ranked question-answer pairs, and return the predetermined number of highest ranked question-answer pairs to a user.

According to embodiments of the present disclosure, a computer program product for generating question and answer pairs, the computer program product comprising a computer readable storage medium having program instructions embodied therewith. The program instructions may be executable by the processor to cause the processor to receive an input document, the input document comprising content. The program instructions may further cause the processor to generate, by a first machine learning model from the input document, a plurality of answers based on the content of the input document, and generate, by a second machine learning model from the input document, a question for each of the plurality of answers to form a plurality of question-answer pairs. The program instructions may further cause the processor to rank, by a third machine learning model, the plurality of question-answer pairs, select a predetermined number of highest ranked question-answer pairs, and return the predetermined number of highest ranked question-answer pairs to a user.

According to embodiments of the present disclosure, a computerized method for building a dialogue flow, comprising receiving an input document, the input document comprising content, and generating, by a question-answer pipeline, a plurality of question-answer pairs from the content of the input document. For each question-answer pair, the method may further comprise feeding the question of the question-answer pair into an intent of a dialogue flow structure, and feeding the answer of the question-answer pair as one response of the intent. The method may further comprise tagging each of the plurality of question-answer pairs with a corresponding document section index, reading, by a conversational agent, the input document to a user, pausing the reading when the conversational agent reaches one of the document section indices in the input document, and in response, reading the question corresponding to the document section indicia to the user.

According to embodiments of the present disclosure, a computer program product for building a dialogue flow, comprising a computer readable storage medium having program instructions embodied therewith. The program instructions may be executable by a processor to cause the processor to collect user input for a plurality of input document texts via a graphical web user interface, using the user input to train a first deep learning model, feed a new input document text to the first deep learning model, and extract, by the first deep-learning model, a plurality of question-answer pairs from the input text. The program instructions may further cause the processor to tag of the plurality of question-answer pairs with the corresponding document section index, and generate, by a second deep-learning model for at least some of the plurality of question-answer pairs, at least one additional answer with a similar semantic meaning to the answer and at least one contradictory additional answer with an opposite semantic meanings to the answer, and form a plurality of <question, correct answers, incorrect answers>tuples from the question-answer pairs, the additional answers, and the contradictory answers. For each <question, correct answers, incorrect answers>tuple, the program instructions may further cause the processor to feed each question into a new intent of a dialogue flow structure, feed the correct answers as one response of the intent, and feed the incorrect answers as another response option of the intent.

According to embodiments of the present disclosure, a system for building a dialogue flow, comprising a processing unit, and a memory coupled to the processing unit. The memory may contain program instructions executable by the processing unit to cause the processing unit to receive an input document, the input document comprising content, and generate, by a question-answer pipeline, a plurality of question-answer pairs from the content of the input document. For each question-answer pair, the memory may further contain program instructions to cause the processing unit to feed the question of the question-answer pair into an intent of a dialogue flow structure, and feed the answer of the question-answer pair as one response of the intent. The memory may further contain program instructions to cause the processing unit to tag each of the plurality of question-answer pairs with a corresponding document section index, read, by a conversational agent, the input document to a user, pause the reading when the conversational agent reaches one of the document section indices in the input document, and in response, reading the question corresponding to the document section indicia to the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 is a flow chart illustrating one method of automatically generating a list of QA Pairs from an input document consistent with some embodiments.

Figure 1:
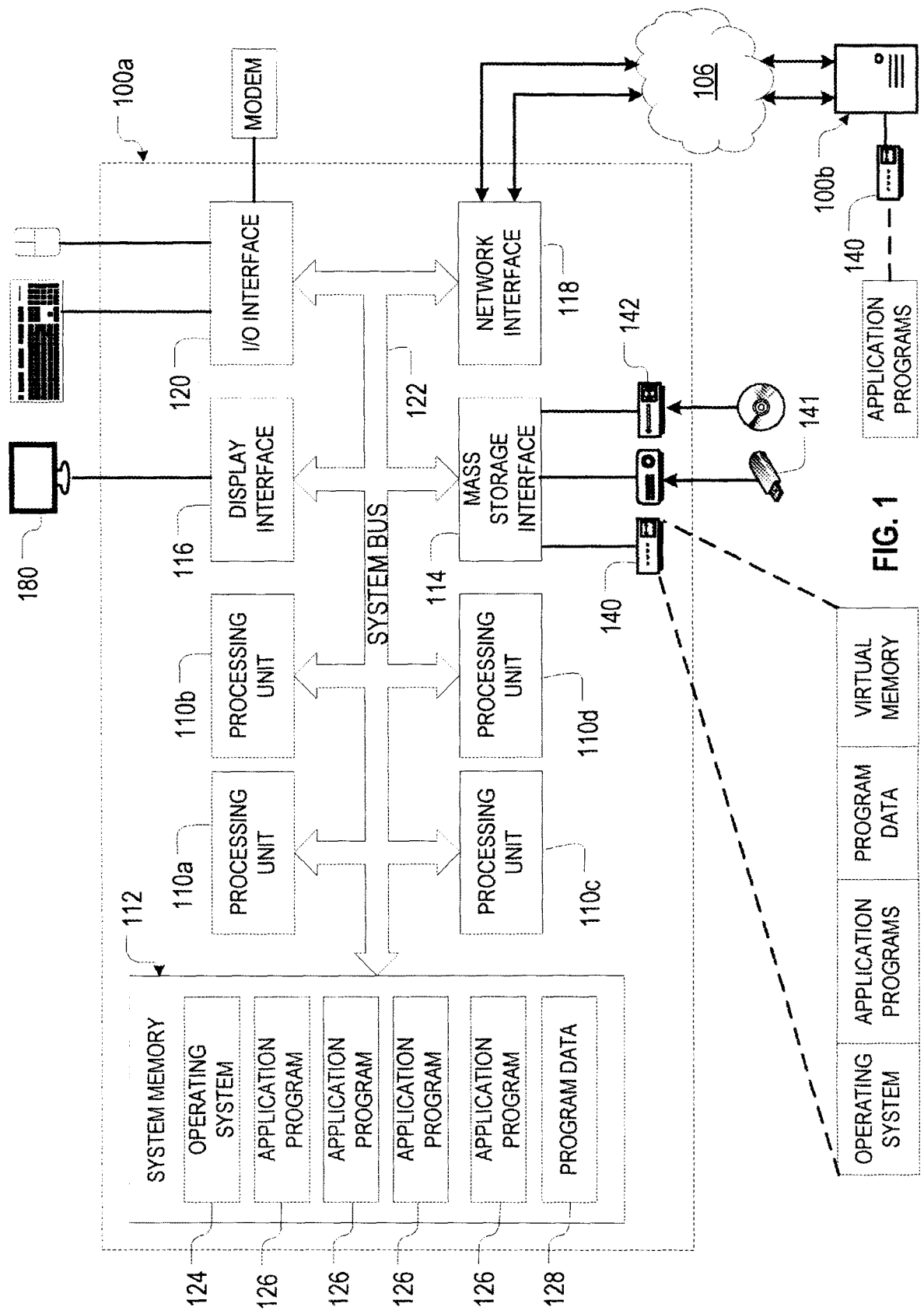
FIG. 1 illustrates one embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to artificial intelligence (AI), more particular aspects relate to the use of AI for human computer interaction (HCI). While the present disclosure is not necessarily limited to such applications, various aspects of the disclosure may be appreciated through a discussion of various examples using this context.

Many IT departments are becoming overwhelmed by the amount of information available to them from various structured and unstructured sources. For example, many IT products are provided with rich product documentation. Counter-intuitively, however, the very scope of that documentation may make it hard for IT staff to find the particular portion(s) of the documentation that is relevant at any particular moment. Moreover, information gaps may develop as IT staff try to piece together that documentation with the results of Internet search(es) on various subjects.

To assist their customers' IT staff, some enterprise IT system developers utilize Question and Answer (QA) systems, which may take a natural language question as input and return results indicative of the most probable answer to the input question. In particular, some QA systems may interpret a natural language input question; analyze large sources of content (e.g., product documentation) with regard to the input question; and then generate an answer to the input question, together with a confidence measure as to how accurate that answer is with respect to the input question.

QA systems are not merely document search systems. One difference between a QA system and document search systems is that the document search systems typically take a keyword query and return a list of documents, ranked in order of relevance to the query. QA systems, on the other hand, may take a question expressed in natural language, seek to understand it in detail, and return a precise answer to that question. For example, an end user of a QA system may enter a question in natural language form (e.g., via a chatbot) much as if they were asking another person. In response, the QA system may sift through vast amounts of potential evidence to return a ranked list of relevant answers. These output of the QA system may also include summaries of justifying/supporting evidence, which may enable the end user/customer to quickly assess that evidence.

QA systems are also not merely a search engine. While a search engine (e.g., an Internet web search engine) typically has access to an immense source of information and can quickly find relevant results (e.g., web pages) given a small number of query terms, search engine do not return answers to questions; rather, search engines return a ranked list of results (e.g., web pages) that the user may be trying to find.

Traditional, knowledge-based artificial intelligence approaches to QA systems try to logically prove an answer is correct from a logical encoding of the question and from all the domain knowledge relevant to that question. Such traditional approaches have challenges, however, including the prohibitive time and manual effort involved in acquiring the relatively large volumes of knowledge they require, and then formally encoding that knowledge into logical formulas that are accessible to their models. Further, these traditional approaches have difficulty understanding natural language questions well enough to exploit such formal encodings. Consequently, such traditional QA systems tend to falter in terms of breadth. Template based approaches have been applied to partially ameliorate this problem, but such template based approaches are prone to error, and typically only point to a relevant page or section, but not the correct answer itself.

Accordingly, some embodiments of the present disclosure may provide an AIOps system that uses big data, analytics, and machine learning (ML) capabilities to do one or more of the following: (i) collect and aggregate the relatively large volumes of operations data generated by multiple IT infrastructure components, applications, and performance-monitoring tools; (ii) intelligently sift 'signals' out of the 'noise' to identify events and patterns related to system performance and availability issues; (iii) diagnose and report root causes to IT for rapid response and remediation—or, in some cases, automatically resolve these issues without human intervention; and (iv) replace multiple separate, manual IT operations tools with a single, intelligent, and automated IT operations platform. By replacing manual IT operations tools in this way, some embodiments may enable IT operations teams to respond more quickly—even proactively—to slowdowns and outages, with less effort. Accordingly, some embodiments may be useful by bridging the gap between an increasingly diverse, dynamic, and difficult-to-monitor IT landscape on the one hand, and meeting user expectations for little or no interruption in application performance and availability on the other.

More specifically, some embodiments may use artificial intelligence (AI) to automatically generate and then rank question-answer (QA) pairs from source documents, such as product documentation. In some embodiments, the AI may perform four operations: (i) parsing a new input document; (ii) extracting key concepts from the input document, and then using those key concepts to generate candidate answers; (iii) for each candidate answer, generating one or more questions that may lead to that answer, thereby forming a plurality of question and answer (QA) pairs; and (iv) ranking all of the QA pairs, and then selecting/returning a predetermined number of the highest ranked QA pairs. As an illustrative example, one of the input documents may comprise the following text:

CICS® TS for z/OS® product documentation is provided in information centers for download to your environment. IBM® plans to provide a version of IBM Knowledge Center for use offline. When this is available, it will replace the CICS TS information centers.

You can set up the information center to run on a server over your organization's intranet, or as a local installation on your own system. CICS information centers consist of a framework—the IBM User Interface Help System, built on Eclipse—and content, delivered as a set of document plug-ins. CICS information centers run in a Windows, Linux®, AIX®, or z/OS® environment. You view the information center in your usual Web browser.

You can choose to download either a package that includes both the Eclipse framework and the CICS content, or simply the CICS content to integrate with an existing information center. To download the information center that includes both CICS content and the Eclipse framework, go to the: IBM Publications Center. To download only the CICS content, go to the CICS information download site.

Some embodiments of the present disclosure may generate the corresponding QA pairs from that input text:

<"Where can I download CICS content?","CICS information download site <https://xxx.xxx.xxx.xxx?">

<"What environments can CICS run on?","Windows, Linux, AIX, or z/OS"?>

These resulting QA pairs may be useful to automatically generate a frequently asked questions (FAQ) page and/or to automatically generate response trees for use by chat bots.

In some embodiments, the AI may comprise a deep-learning architecture to automatically generate questions and answers using three subsystems: an answer extraction subsystem, a question generation subsystem, and a ranking subsystem. The answer generation subsystem may comprise a first a first deep-learning model that parses an input document and identifies parts of speech, named entities, and semantic roles. The answer generation subsystem may further comprise a second deep-learning model that identifies key facts and relationships using the parsed document as input. The question generation subsystem may comprise a third deep-learning model that takes one of the answers and the parsed documentation as input, and then generates one or more questions that match that answer. This operation may be repeated for each of the answers, forming a plurality of QA pairs. The ranking subsystem may comprise a fourth deep-learning model that ranks the QA pairs, both in terms of relative importance (e.g., what would a typical IT staff member find important in the input document) and in terms of semantic correctness, and returns a predetermined number of the highest ranking QA pairs. The deep-learning models may be trained by collecting user input for related input texts (e.g., questions from real customers/users relating to similar product documentation). In this way, some embodiments may generate questions similar to those that would be submitted by actual customers in response to the new input document (e.g., a new product's documentation).

Data Processing System (DPS)

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The DPS 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
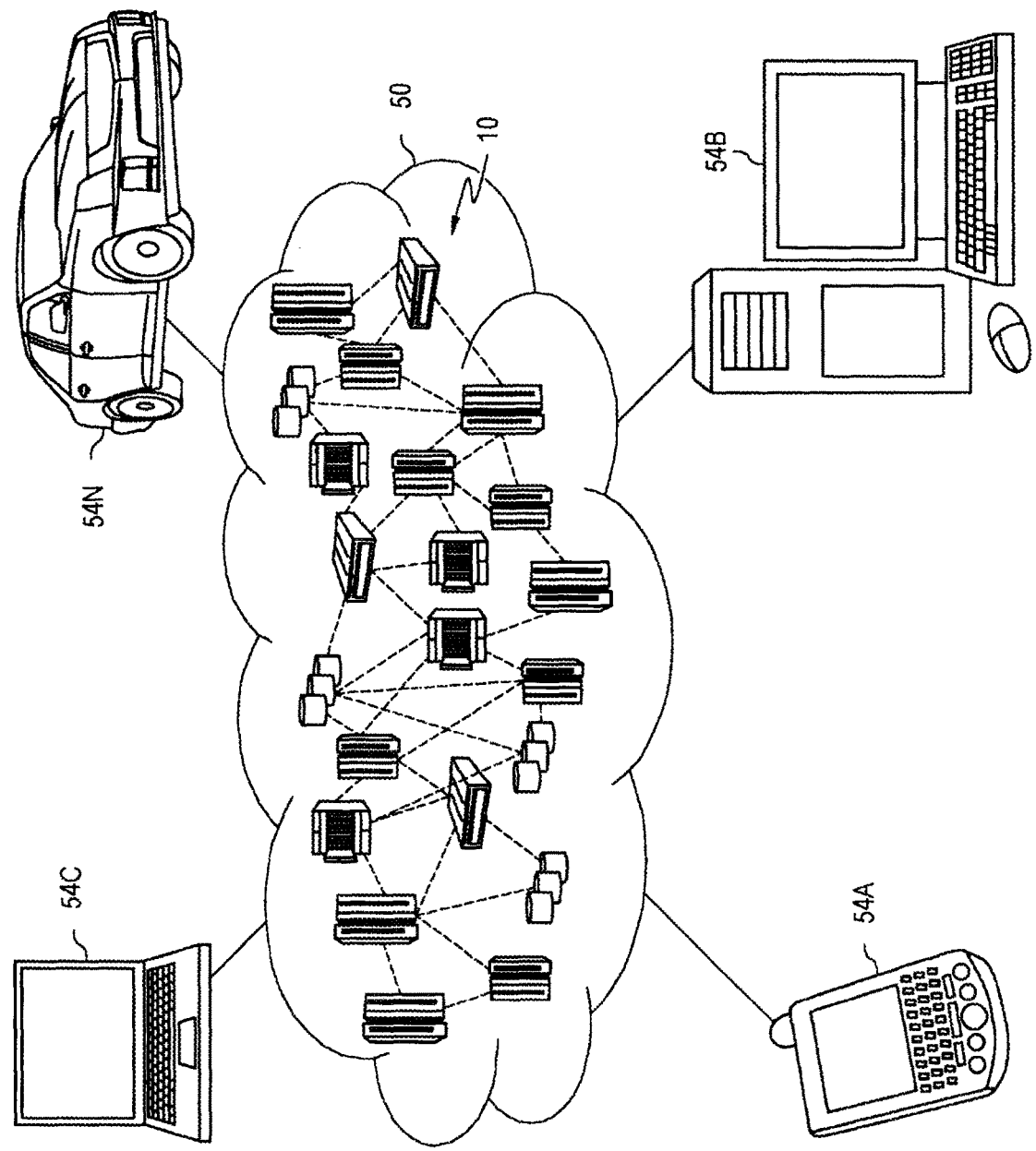
FIG. 2 illustrates one embodiment of a cloud environment suitable for an edge enabled scalable and dynamic transfer learning mechanism.

FIG. 2 illustrates one embodiment of a cloud environment suitable for enabling a QA system. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
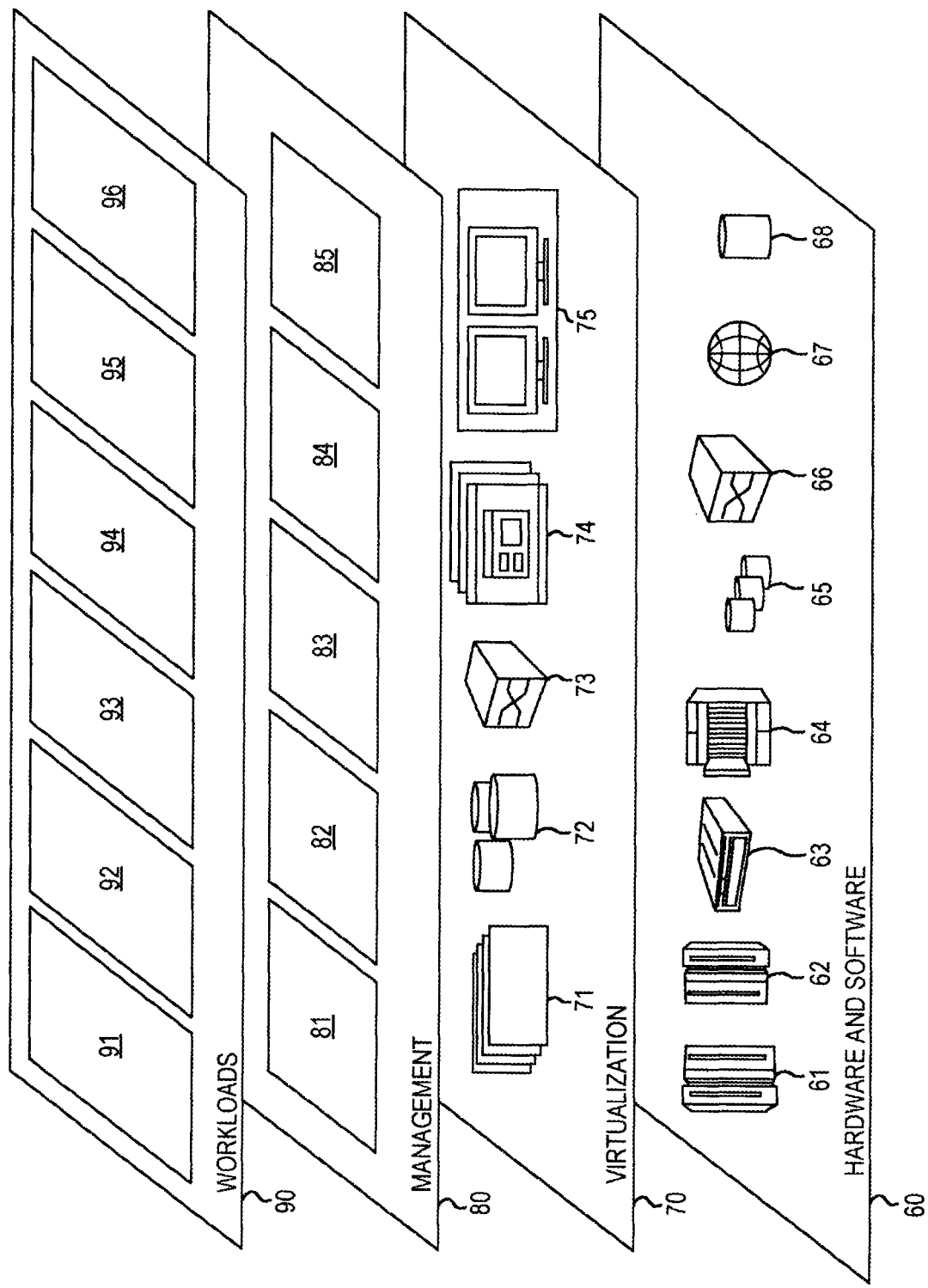
FIG. 3 shows a set of functional abstraction layers provided by a cloud computing environment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a machine learning (ML) model 96.

Artificial Intelligence

The AI in some embodiments may comprise one or more machine learning (ML) models, such as ML model 96. The ML models, in turn, may be any software system that recognizes patterns. In some embodiments, the ML models comprise a plurality of artificial neurons interconnected through connection points called synapses or gates. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The ML models may be trained to solve a specific problem (e.g., answer generation, etc.) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers.

Figure 4A:
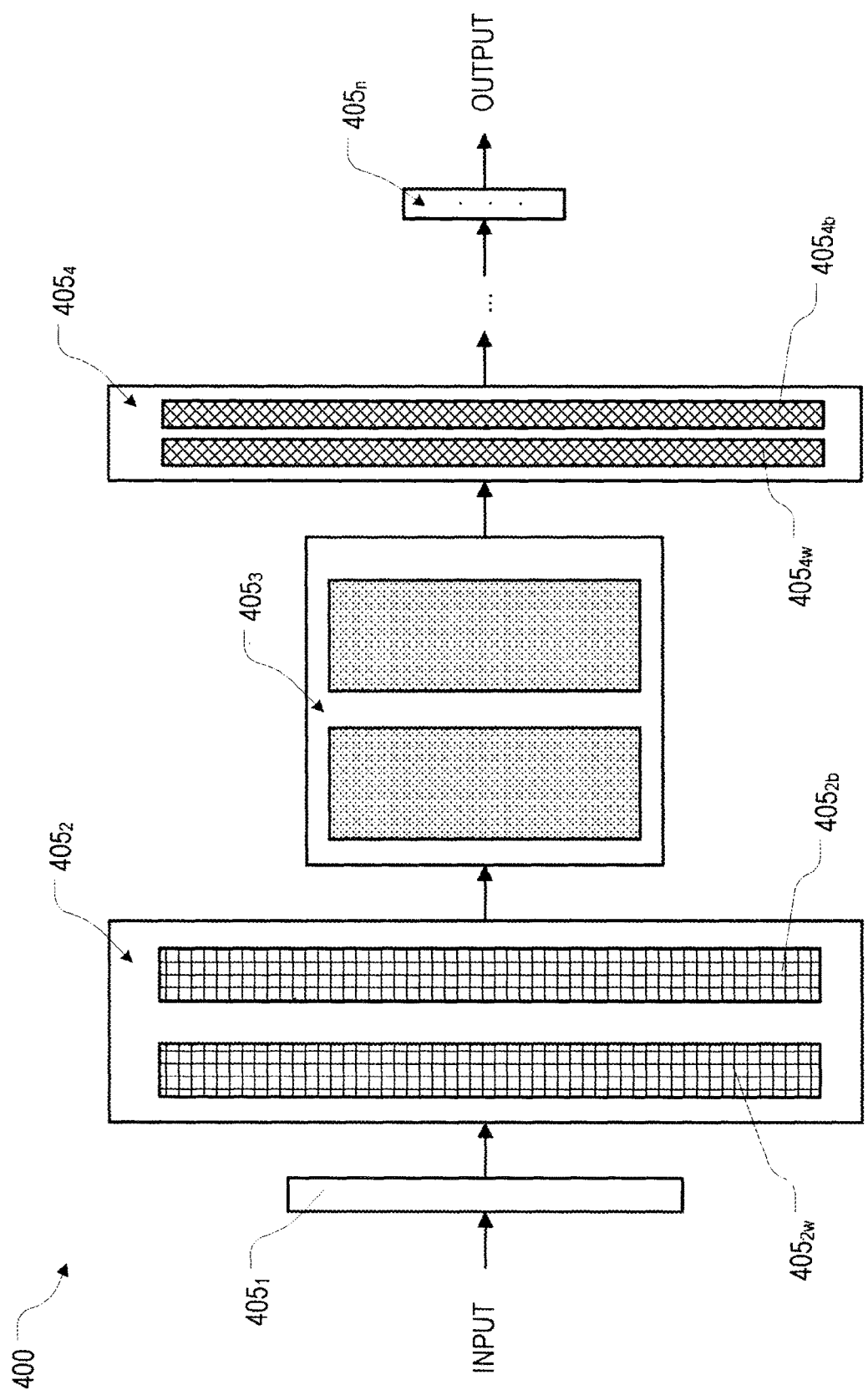
FIG. 4A illustrates an example ML model, consistent with some embodiments.

FIG. 4A illustrates an example ML model 400, consistent with some embodiments. The ML model 400 comprises a plurality of layers $405_1$-$405_n$. Each of the layers comprises weights $405_{1w}$-$405_{nw}$, and biases $405_{1b}$-$405_{nb}$ (only some labeled for clarity). The layer $405_1$ that receives external data is the input layer. The layer $405_n$ that produces the ultimate result is the output layer. Some embodiments include a plurality of hidden layers $405_2$-$405_{n-1}$ between the input and output layers, and commonly hundreds of such hidden layers. Some of the hidden layers $405_2$-$405_{n-1}$ may have different sizes, organizations, and purposes than other hidden layers $405_2$-$405_{n-1}$. For example, some of the hidden layers in the ML model may be convolution layers, while other hidden layers may be fully connected layers, deconvolution layers, or recurrent layers.

Figure 4B:
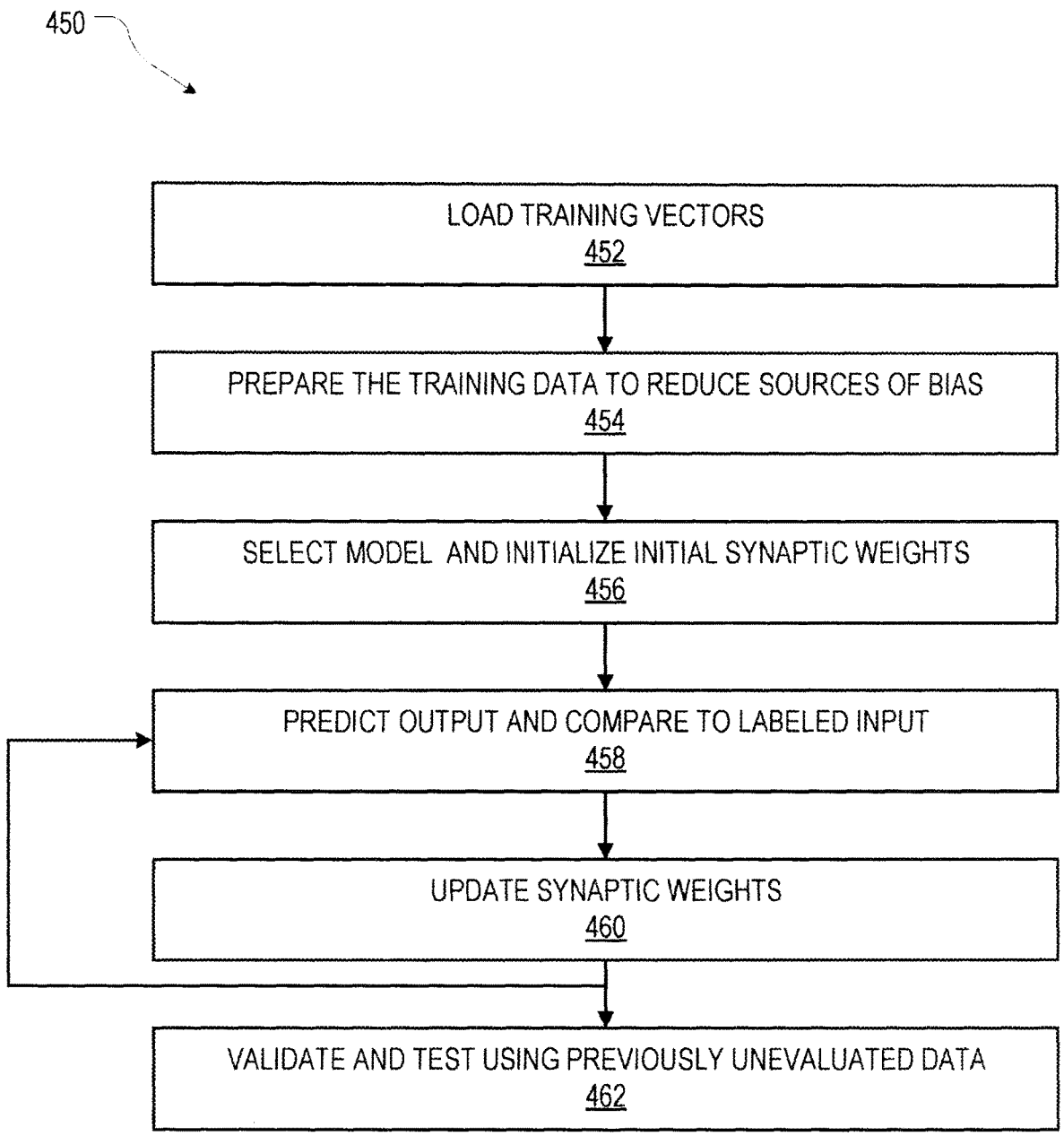
FIG. 4B depicts one embodiment of a ML model training method is depicted, consistent with some embodiments.

Referring now to FIG. 4B, one embodiment of a ML model training method 450 is depicted, consistent with some embodiments and described with reference to answer generation as an illustrative example. At operation 452, the system receives and loads training data. In this example, the input data-set may include questions actually submitted by organization's real-world customers to previous generations of a product/product documentation via a graphical web interface, or QA pairs generated by experienced employees that will be used to train new hires. At operation 454, the training data is prepared to reduce sources of bias, typically including de-duplication, normalization, and order randomization. At operation 456, a model is selected for training and the initial synaptic weights are initialized (e.g., randomized). Depending on the underlying task, suitable models include, but are not limited to, feedforward techniques (e.g., convolutional neural networks), regulatory feedback-based systems, radial basis function (RBF) techniques, and recurrent neural network-based techniques (e.g., long short-term memory). At operation 458, the selected model is used to predict an output using the input data element, and that prediction is compared to the corresponding target data. A gradient (e.g., difference between the predicted value and the target value) is then used at operation 460 to update the synaptic weights. This process repeats, with each iteration updating the weights, until the training data is exhausted, or the model reaches an acceptable level of accuracy and/or precision. At operation 462, the resulting model may optionally be compared to previously unevaluated data to validate and test its performance.

QA Generation Pipeline

Figure 5:
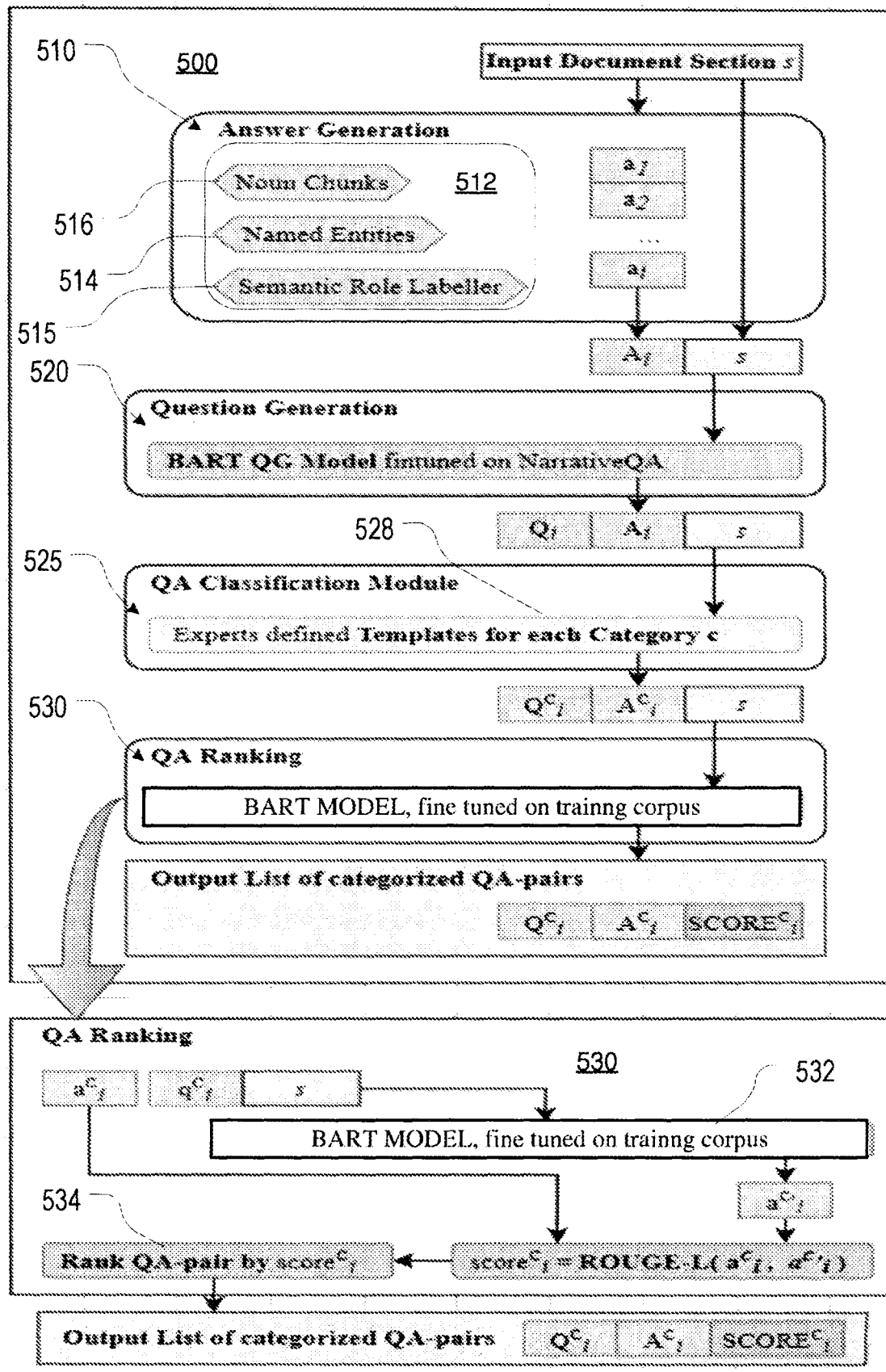
FIG. 5 is a system diagram of a QA generation pipeline, consistent with some embodiments.

FIG. 5 is a system diagram of a QA generation pipeline 500, consistent with some embodiments. This QA generation pipeline 500 may comprise three subsystems: a rule-based answer generation (AG) subsystem 510, question generation (QG) subsystem 520, and ranking subsystem 530.

The AG subsystem 510 in some embodiments may receive a document "z" (e.g., text-based documentation) as input. The AG subsystem 510 may then pass the input document z a language model 512 for part-of-speech tagging. This language model 512 may include a named entity extractor 514 and noun chunk extractor 516, which may identify the subject(s) and object(s) of sentences in the input document z. The language model 512 may also include a semantic roles labeler 515, which may extract the trigger verb(s) and other dependenc(ies) from the input document z. The subjects, objects, verbs, and dependencies may be combined by the language model 512 to create a plurality of candidate answers, $a_1 \ldots a_i$, (collectively $A_i$). The named entity extractor 514, the noun chunk extractor 516, and the semantic roles labeler 515 may each comprise a separate, trained ML model in some embodiments. These trained ML models may be general purpose ML models trained to parse textual material.

The candidate answers $A_i$ may then be passed to the QG subsystem 520, together with the original text z, as inputs. QG subsystem 520 may use these inputs to generate at least one associated question $q_1 \ldots q_i$ (collectively $Q_i$) for each generated answer $A_i$. These questions $Q_i$ and answers $A_i$ may be stored together as question-answer pairs (QA pairs). In some embodiments, these QA pairs may have one or more action, causal relationship, and outcome resolution relationships involving one or more facts, actions, or events in the input document z. The outcome resolution relationships, in turn, may use the output from the semantic roles labeler 515 (e.g., trigger verb and other dependency nodes) to put together as a combination of subject, verb, and object as the associated question $Q_i$.

The QG subsystem 520 in some embodiments may comprise a BART-based deep-learning model. BART, in turn, generally refers to a class of "Bidirectional and Auto-Regressive Transformer" models that were originally proposed in Mike Lewis, Yinhan Liu, Naman Goyal, Marjan Ghazvininejad, Abdelrahman Mohamed, Omer Levy, Ves Stoyanov and Luke Zettlemoyer, "BART: Denoising Sequence-to-Sequence Pre-training for Natural Language Generation, Translation, and Comprehension" (29 Oct., 2019). In some embodiments, the BART-based deep-learning model may be further fine-tuned on a dataset (not shown) similar to the input document z.

Optionally, in some embodiments, the QA pipeline 500 may further use a QA classification subsystem 525 containing a plurality of expert-defined templates 528. These templates 528 may be used to better create a plurality of types/categories of questions "c" from among the generated answers $A_i$. In this way, the expert-defined templates 528 may ensure a wide variety of QA pair types are created, which in turn, may help the QA pipeline 500 produce questions similar to those submitted by actual customers in response to the training corpus. For example, some QA pairs may be directed to specific triggers/responsive actions (e.g., Q: "What should I do when my XXX server fails?" A: "you can refer to http://xx.xx.xx and follow the following steps. Step 1. . . .") and some may be directed to specific facts (e.g., "Q: "Where can I find a system update patch file?" A: "http://bb.bb.bb").

The AG subsystem 510 and QG subsystem 520 described above may generate a relatively large number of QA pairs, more than is typically desired by an end user of a particular application e.g., more than 14,000 QA pairs for a typical IT-related input document. Accordingly, some embodiments may use the ranking subsystem 530 to reduce that output to a predetermined number of the comparatively highest-quality QA pairs. The QA ranking subsystem 530, in turn, may comprise a QA rating model 532 and a scoring subsystem 534.

In operation, the QA rating model 532 may receive the QA pairs and the input document z as input, and may provide automated evaluation of generated QA quality. The QA rating model 532 may be a BART-based ML model trained to evaluate whether each generated answer $A_i$ matches its associated generated question $Q_i$, and this BART-based model may be trained and/or fine-tuned on a similar data corpus to the input document z. Some QA rating models 532 may output a RougeL score for each QA pair, as described in Chin-Yew Lin. "Rouge: A package for automatic evaluation of summaries," (2004) as the evaluation metric. The scoring subsystem 534 may return a predetermined number of the highest ranked QA pairs as a list, together with their associated scores.

Automatically Generating QA Pairs

FIG. 6 is a flow chart illustrating one method 600 of automatically generating a list of QA Pairs from an input document, such as technical documentation, consistent with some embodiments. This method 600 may, for example, be used to generate a frequently-asked-questions list or a list of answers-responses for a chatbot. At operation 605, a DPS 100 operating in the cloud environment 50 may collect a plurality of questions from real world customers, together with the associated product documentation. This information may be stored in an associated data store, such as database software 68. At operation 610, the stored documentation and customer questions may be used as a data corpus to train one or more ML models, such as the ML models in the AG subsystem 510, the QG subsystem 520, and the ranking subsystem 530.

At operation 615, the DPS 100 may receive a new set of product documentation. In response, the AG subsystem 510 may analyze the product documentation and may generate a plurality of answers $A_i$ based on the content of the input document at operation 620. This may include parsing the input documentation to identify one or more parts of speech (e.g., noun chunks), named entities, and semantic roles. The QG subsystem 520 may then generate a question $q_i$ for each of the plurality of answers $a_i$ at operation 625, thus forming a plurality of QA pairs.

At operation 630, the DPS 100 may rank the plurality the question-answer pairs based on one or more criteria, such as a RougeL sore and/or how closely the QA pairs resemble the questions received at operation 605. In some embodiments, this ranking may be performed by an ML model. Next, a predetermined number of the highest ranked QA pairs may be selected, and then returned to a user, at operation 635.

Automated Generation of Dialogue Flow from Documents

Figure 7:
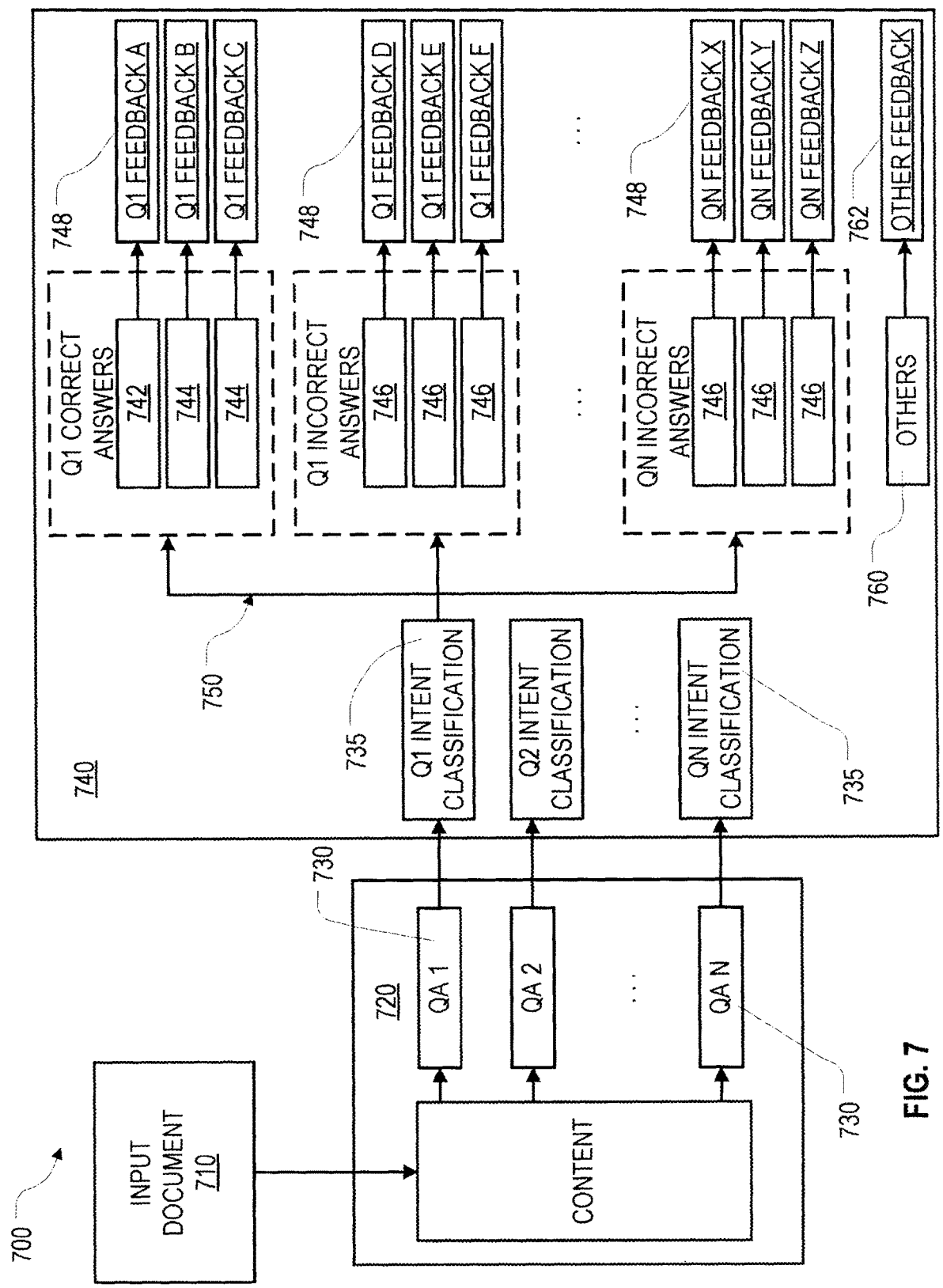
FIG. 7 is a system diagram of a conversational agent system, consistent with some embodiments.

FIG. 7 is a system diagram of a conversational agent system 700, consistent with some embodiments. The embodiment in FIG. 7 may comprise a document reading subsystem 720 that can ingest an input document 710 and generate a plurality of QA pairs 730 therefrom, and a dialogue subsystem 740 in which a dialogue flow structure 750 may be created. The dialogue flow structure 750 may associate a correct answer 742, a plurality of alternative correct answers 744, and a plurality of incorrect answers 746 for each of a plurality of anchor questions 735 (e.g., the highest rated questions) from the QA-pairs 730. The correct answer 742, the plurality of alternative correct answers 744, and the plurality of incorrect answers 746 may each be associated with one of a plurality of feedback responses 748. The dialogue flow structure 750 may also contain an all-other-answers option 760, together with an associated feedback response 762, for answers not otherwise addressed in the dialogue flow structure 750

As an illustrative example, the conversational agent system 700 may be used to train a new SRE (site reliability engineer). Traditional conversational agents systems were not well adapted to this application because those traditional systems could not easily digest IT support documents, and because the manual building of such traditional systems was time-consuming and expensive. Some conversational agent systems 700, in contrast, may include an architecture and system that may automatically generate dialogue flows from technical documentation. This architecture may include advanced neural network algorithms trained on question-answer pairs from experienced SREs (i.e., actual, real-world users). In this way, some embodiments may simulate the type and difficulty of questions that an experienced SRE would ask to a newly hired SRE.

However, while embodiments of the conversational agent system 700 will be described with reference to onboarding SREs, those skilled in the art will appreciate that its methods and architecture are generic. Thus, embodiments of the conversational agent system 700 can be adapted to a wide variety of input documents and generate dialogue trees therefrom, and its advanced neural network algorithms may be fine-tuned using a variety of training sets. For example, as will be described in more detail in the Appendices, embodiments of the disclosure have been successfully applied to educational software.

In operation, the conversational agent system 700 may: (i) collect input from one or more experienced SREs via a graphical web user interface. This input may comprise a plurality of QA pairs and an associated technical support document; (ii) use the collected answers to train a QA system, such as the QA generation pipeline 500 discussed in more detail with respect to FIG. 5; (iii) parse a new input document (e.g., feeding the document's text into the document reading subsystem 720, generating a plurality of QA pairs therefrom, then selecting a plurality of the highest ranked QA pairs as "anchor" questions 735 for inclusion in the dialogue flow structure 750, and identifying corresponding document location for each anchor question 735); (iv) generate a plurality of alternative answers and incorrect answers for each anchor question 735; (v) feed the anchor questions, correct answers 742, alternative correct answers 744, incorrect answers 746 into the dialogue flow structure 750; and (vi) by the dialogue subsystem 740, read the input document to a new SRE, pausing when it reaches one of the document locations associated with the anchor questions 735 and then triggering the dialogue subsystem 740 to handle new SREs responses pursuant to dialogue flow structure 750.

Figure 8A:
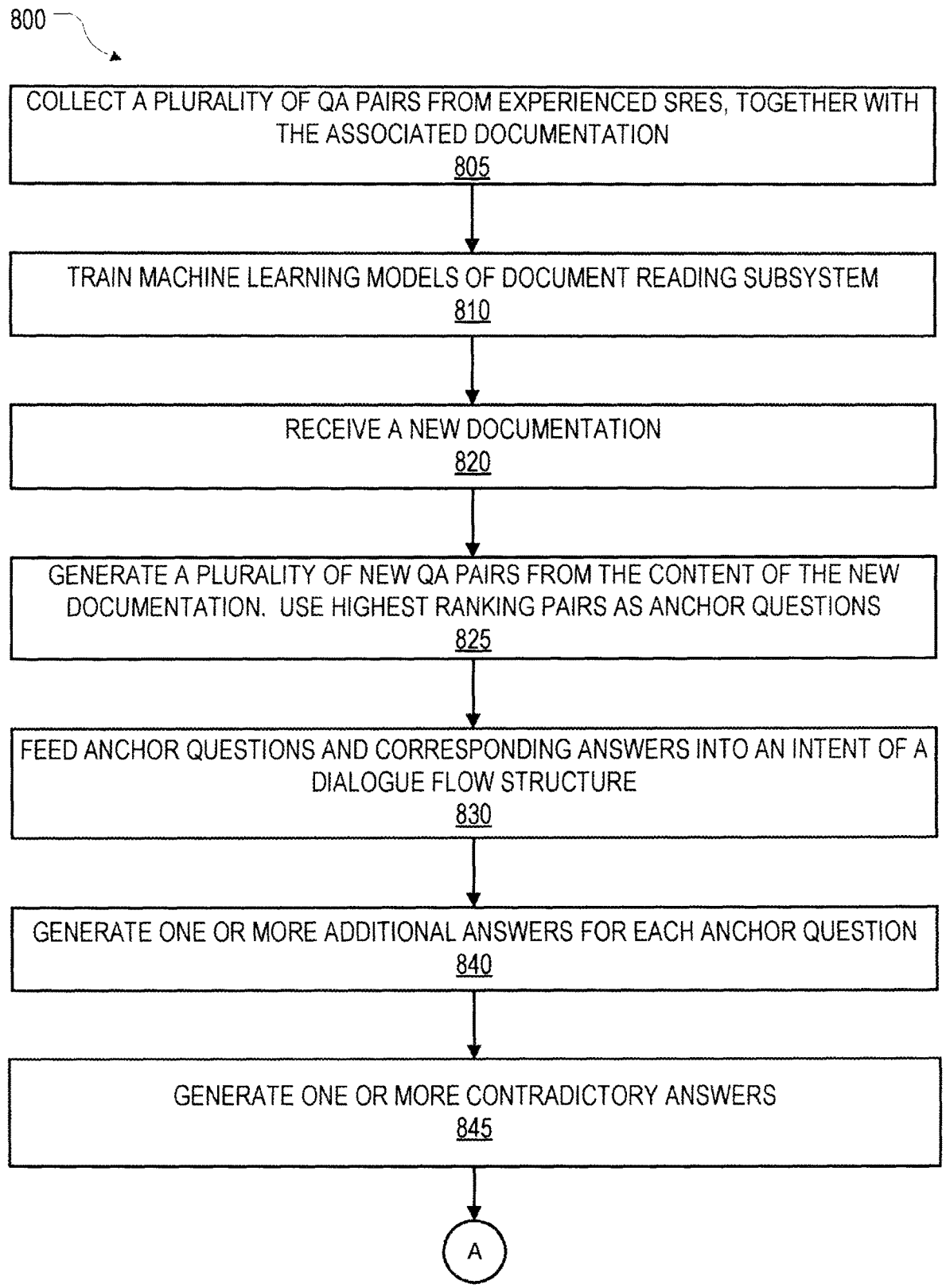
FIG. 8A-8B are a flow chart illustrating one method of operating the conversational agent system in more detail, consistent with some embodiments.
Figure 8B:
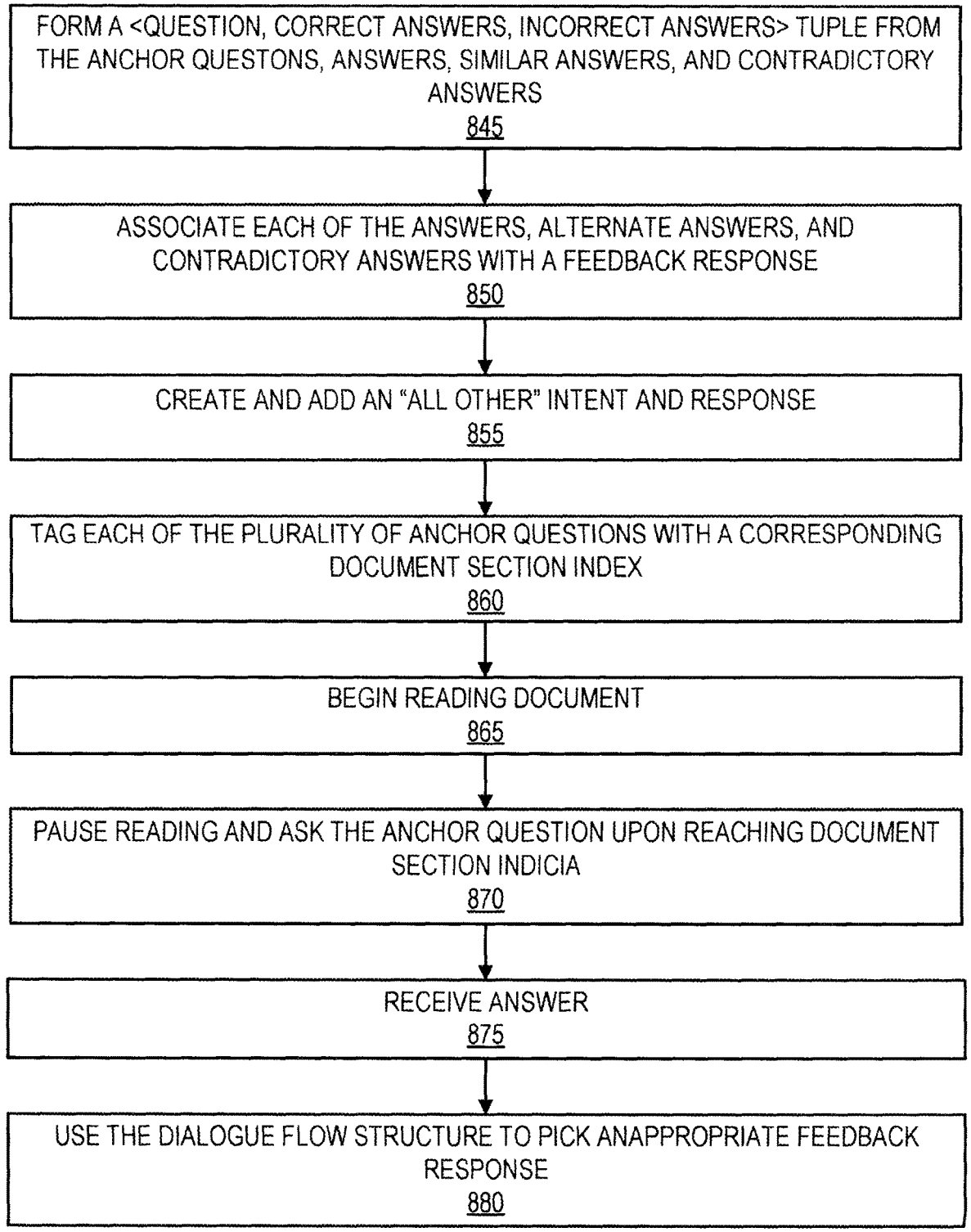

FIGS. 8A-8B are a flow chart illustrating one method 800 of operating the conversational agent system 700 in more detail, consistent with some embodiments. In some embodiments, method 800 may begin at operation 805 by receiving a plurality of questions and answers about a training document from one or more experienced SREs via a graphical user interface. These questions and answers may represent details that the experienced SREs believe represent the most relevant and/or important portions of the training document. The inputs may be stored in a data store, together with the associated training documents. Next, at operation 810, the plurality of inputs and documents may be used to train and/or fine tune one or more ML models of the document reading subsystem 720. This document reading subsystem 720 may comprise the question-answer pipeline 500 described in more detail with reference to FIG. 5. In this way, the document reading subsystem 720 may produce QA pairs 730 similar to those that the experienced SREs would have produced had they read that particular document.

A new input document (e.g., new technical documentation) may be received at operation 820 by the trained document reading subsystem 720. In response, the trained document reading subsystem 720 may generate a plurality of new QA pairs 730 from the content of the new input document at operation 825. The highest ranking questions from the QA pairs 730 may be used as anchor questions 735. Next, at operation 830, anchor questions 735 may be fed into an intent of the dialogue flow structure 750; and the corresponding answer from the QA pairs 730 may be feed into the dialogue flow structure as the correct answer 742 of that intent.

Optionally, in some embodiments, the trained document reading subsystem 720 may also generate one or more additional answers 744 for each anchor question 735 at operation 840. The additional answers 744 may have similar semantic meanings (e.g., paraphrases) to the correct answer 742, The trained document reading subsystem 720 may also generate, for each anchor question 735, one or more contradictory answers 746 with opposing/opposite semantic meanings to the correct answer 742 at operation 842. These correct answers 742, similar answers 744, and contradictory answers 746 may be associated with the anchor questions 735 to form a <question, correct answers, incorrect answers>tuple at operation 848. The <question, correct answers, incorrect answers>tuple may be fed into the dialogue flow structure 750 at operation 848 as alternate correct answers and incorrect answers.

At operation 850, each of the answers 742, alternate answers 744, and contradictory answers 746 may be associated with a one of a plurality of feedback responses 748. These feedback responses may be generic (e.g., "correct," "good job," etc.), customized (e.g., "sorry, the correct answer is . . . "), or a combination of both types. At operation 855, an "all other" intent 760 and response 762 may be created and added to the dialogue flow structure 750.

At operation 860, each of the plurality of anchor questions 735 may be tagged with a corresponding document section index (e.g., a particular part of the input document to which that anchor question 735 relates). The dialogue subsystem 740 may begin reading the input document to the new SRE at operation 865. When the dialogue subsystem 740 reaches one of the document section indices in the input document, the dialogue subsystem 740 may pause the reading and ask the anchor question 735 corresponding to that document section indicia to the new SRE at operation 870. The new SRE may respond with (and the dialogue subsystem 740 may receive) a received answer to the anchor question 735 at operation 875. The dialogue subsystem 740 will then use the dialogue flow structure 750 to pick an appropriate feedback response 748, 762 to the received answer. This may include associating the received answer with one of: the answer 742, the alternative answers 744, the incorrect answers 746, or the other response 760 in the dialogue flow structure 750 at operation 880, and then replying to the new SRE using the associated feedback response 748, 762 at operation 885. Operations 860-885 may then repeat for each document section index in the document.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

While embodiments of the disclosure have been described with reference to AIOps and training SREs, other applications are within its scope and spirit. For example, as described in more detail in the Appendices below, embodiments of the disclosure have been successfully applied to educational software, such as reading and automatically generating question-answer pairs (QA pairs) for children's storybooks. In addition, some embodiments allow parents and/or guardians to collaborate with the system to create storytelling experiences, complete with interactive questioning and answering. Additionally, some embodiments may provide two distinct modes: (i) an assisted parent-AI co-reading mode, in which the system may assist the parent in storytelling by identifying potential opportunities for asking questions and recommending follow-up questions. Embodiments operating in this mode may reduce the cognitive load and lower the literacy barrier for the parent, facilitate skill development for the child, while encouraging direct parent-child interaction that both parties value in their relationship; and (ii) an asynchronous automated bot-reading mode, in which a parent can create an interactive storytelling bot for any story by configuring the question generation model, selecting from the generated questions, and customizing follow-up questions. The bot can then tell stories, ask children questions and provide feedback, and converse with the children to keep them engaged without intervention from the parents. In both modes, some embodiments may track the child's progress and may enable a dashboard that may help parents visualize their child's performance data, enabling the parent to assess the development of the child's comprehension skills.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A computerized method for building a dialogue flow, comprising:
   receiving a plurality of training inputs;
   storing the plurality of training inputs into a data store;
   using the plurality of training inputs to train a question-answer pipeline;
   receiving an input document, the input document comprising content;
   generating, by the question-answer pipeline, a plurality of question-answer pairs from the content of the input document, wherein the plurality of question-answer pairs includes a plurality of questions generated by the question-answer pipeline and a plurality of corresponding answers generated by the question-answer pipeline;
   for at least one question-answer pair:
   feeding a respective question of the at least one question-answer pair into an intent of a dialogue flow structure;
   feeding a respective answer of the at least one question-answer pair as one response of the intent;
   tagging the at least one question-answer pair with a corresponding document section index;
   reading, by a conversational agent, the input document to a user; and
   pausing the reading when the conversational agent reaches the corresponding document section index in the input document, and in response, reading the respective question tagged to the corresponding document section index to the user.

2. The computerized method of claim 1, further comprising:
   by the conversational agent, receiving a user answer to the respective question read to the user; and
   responding to the received user answer according to the dialogue flow structure.

3. The computerized method of claim 1, wherein the generating the plurality of question-answer pairs from the content of the input document comprises:
   generating, by an answer generation subsystem of the question-answer pipeline from the input document, a plurality of answer candidates based on the content of the input document;
   generating, by a question generation subsystem of the question-answer pipeline from the input document, a question for each of the plurality of answer candidates to form a plurality of question-answer candidate pairs;
   ranking, by a ranking subsystem of the question-answer pipeline, the plurality of question-answer candidate pairs; and
   selecting a predetermined number of highest ranked question-answer candidate pairs as the plurality of question-answer pairs.

4. The computerized method of claim 1, further comprising:
   for at least one question-answer pair, generating, by a machine learning model, one or more additional answers with similar semantic meanings; and
   associating the additional answers with the at least one question-answer pair to form a <question, correct answers> tuple.

5. The computerized method of claim 4, further comprising:
　generating, by the machine learning model, one or more contradictory answers with opposing semantic meanings; and
　further associating the contradictory answers with the at least one question-answer pair to form <question, correct answers, incorrect answers> tuple.

6. The computerized method of claim 5, further comprising feeding the incorrect answers as another response option of the intent.

7. The computerized method of claim 4, wherein the similar semantic meanings comprise one or more paraphrases of the respective answer.

8. A computer program product for building a dialogue flow, comprising a computer readable storage medium having program instructions embodied therewith, the program instructions executable by a processor to cause the processor to:
　collect user input for a plurality of input document texts via a graphical web user interface;
　use the user input to train a first deep learning model;
　feed a new input document text to the first deep learning model;
　extract, by the first deep learning model, a plurality of question-answer pairs from the input text;
　tag the plurality of question-answer pairs with a corresponding document section index;
　generate, by a second deep-learning model for at least some of the plurality of question-answer pairs, at least one additional answer with a similar semantic meaning to a respective answer and at least one contradictory additional answer with an opposite semantic meanings to the respective answer;
　form a plurality of <question, correct answers, incorrect answers> tuples from the at least some of the plurality of question-answer pairs, the additional answers, and the contradictory answers;
　and for at least one <question, correct answers, incorrect answers> tuple:
　　feed the question into a new intent of a dialogue flow structure;
　　feed the correct answers as one response of the intent; and
　　feed the incorrect answers as another response option of the intent.

9. The computer program product of claim 8, further comprising program instructions to repeat the extracting, tagging, generating, forming, and feeding operations for a plurality of new input documents.

10. The computer program product of claim 8, further comprising program instructions to:
　read, by a conversational agent, the new input document to a user; and
　pause the reading when the conversational agent reaches the corresponding document section index in the input document, and in response, read a respective question tagged to the corresponding document section index to the user.

11. A system for building a dialogue flow, comprising:
　a processing unit;
　a memory coupled to the processing unit, wherein the memory contains program instructions executable by the processing unit to cause the processing unit to:
　receive a plurality of training inputs;
　store the plurality of training inputs into a data store;
　use the plurality of training inputs to train a question-answer pipeline;
　receive an input document, the input document comprising content;
　generate, by the question-answer pipeline, a plurality of question-answer pairs from the content of the input document, wherein the plurality of question-answer pairs includes a plurality of questions generated by the question-answer pipeline and a plurality of corresponding answers generated by the question-answer pipeline;
　for at least one question-answer pair:
　　feed a respective question of the at least one question-answer pair into an intent of a dialogue flow structure;
　　feed a respective answer of the at least one question-answer pair as one response of the intent;
　　tag the at least one question-answer pair with a corresponding document section index;
　　read, by a conversational agent, the input document to a user; and
　　pause the reading when the conversational agent reaches the corresponding document section index in the input document, and in response, read the respective question tagged to the corresponding document section index to the user.

12. The system of claim 11, further comprising program instructions to:
　by the conversational agent, receive a user answer to the respective question read to the user; and
　respond to the received user answer according to the dialogue flow structure.

13. The system of claim 11, wherein the program instructions to generate the plurality of question-answer pairs from the content of the input document further comprises program instructions to:
　generate, by an answer generation subsystem of the question-answer pipeline from the input document, a plurality of answer candidates based on the content of the input document;
　generate, by a question generation subsystem of the question-answer pipeline from the input document, a question for each of the plurality of answer candidates to form a plurality of question-answer candidate pairs;
　rank, by a ranking subsystem of the question-answer pipeline, the plurality of question-answer candidate pairs; and
　select a predetermined number of highest ranked question-answer candidate pairs as the plurality of question-answer pairs.

14. The system of claim 11, further comprising program instructions to:
　for at least one question-answer pair, generating, by a machine learning model, one or more additional answers with similar semantic meanings; and
　associate the additional answers with the at least one question-answer pair to form a <question, correct answers> tuple.

15. The system of claim 14, further comprising program instructions to:
　generate, by the machine learning model, one or more contradictory answers with opposing semantic meanings; and
　further associate the contradictory answers with the at least one question-answer pair to form <question, correct answers, incorrect answers> tuple.

16. The system of claim 15, further comprising further comprising program instructions to feed the incorrect answers as another response option of the intent.

17. The system of claim 14, wherein the similar semantic meanings comprise one or more paraphrases of the respective answer.

* * * * *